(No Model.)

R. BRAYTON.
VEHICLE SPRING.

No. 531,829.  Patented Jan. 1, 1895.

WITNESSES:
Lois Moulton
Lewis E. Flanders

INVENTOR
Richard Brayton
BY
Luther V. Moulton
ATTORNEY.

UNITED STATES PATENT OFFICE.

RICHARD BRAYTON, OF GRAND RAPIDS, MICHIGAN, ASSIGNOR OF ONE-HALF TO MATTHEW C. LEWIS, OF SAME PLACE.

VEHICLE-SPRING.

SPECIFICATION forming part of Letters Patent No. 531,829, dated January 1, 1895.

Application filed April 14, 1894. Serial No. 507,640. (No model.)

*To all whom it may concern:*

Be it known that I, RICHARD BRAYTON, a citizen of the United States, residing at Grand Rapids, in the county of Kent and State of Michigan, have invented certain new and useful Improvements in Vehicle-Springs; and I do hereby declare the following to be a full, clear, and exact description of the invention, such as will enable others skilled in the art to which it appertains to make and use the same.

This invention has relation to vehicle springs, but especially to that class of springs in which the parts are located in different planes so as to be capable of passing each other when they bear heavy loads or are subjected to heavy pressure, and consists in the peculiar construction thereof hereinafter described and claimed.

The object of my invention is to provide in a very simple construction a spring of maximum elasticity. This object is accomplished by the construction illustrated in the accompanying drawings, in which—

Figure 1:
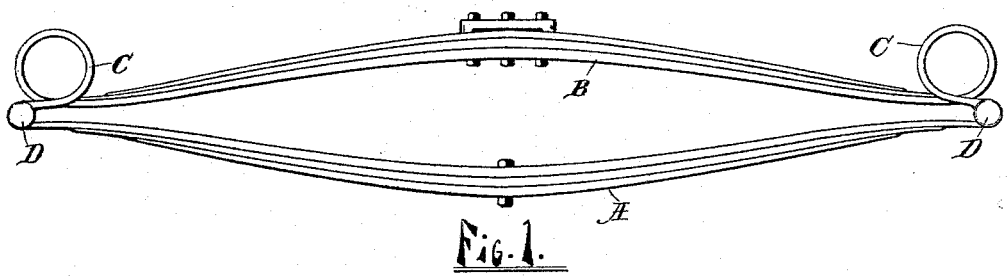
Figure 2:
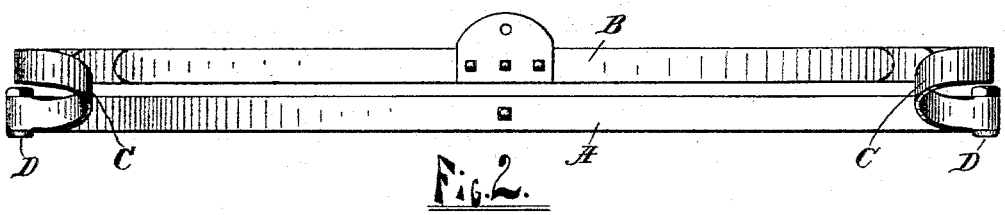
Figure 3:
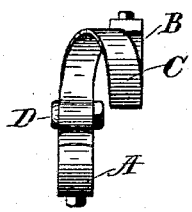

Figure 1 is a front elevation of a device embodying my invention; Fig. 2, a plan view, and Fig. 3 an end elevation of the same.

Like letters refer to like parts in all of the figures.

A represents the lower spring of the usual elliptical form, and B the upper spring, which is also in its middle portion of the usual elliptical form, but instead of being located in the same vertical plane of the spring A, as usual, is located at one side of said plane and parallel thereto but entirely above the spring A and is provided at each end with an integral coiled extension C, which also are located entirely above spring A and extend upward, downward and laterally as shown and terminate in the plane of the spring A, and are pivoted at the ends to the ends of said spring by the usual pivot D. The extension coils C serve to increase the length and flexibility of the spring B, and also by the coiled form serve to set it off out of the vertical plane of the lower spring, so that it will not strike thereon, but pass the same as depressed by the load. I thus secure an extremely elastic and easy riding spring and avoid bumping of the upper and lower parts against each other and secure this result by an extremely simple construction.

What I claim is—

The elliptical springs A and B, said spring A being located entirely in a plane above and at one side of said spring B and having extensions which are also located entirely above said spring A, said extensions being formed with coiled centers and laterally bent ends and having their lower ends pivoted to the extremities of said springs A, said parts being combined and operating substantially as shown and described.

In testimony whereof I affix my signature in presence of two witnesses.

RICHARD BRAYTON.

Witnesses:
    LUTHER V. MOULTON,
    LOIS MOULTON.